United States Patent [19]

Azuma et al.

[11] Patent Number: 5,259,045
[45] Date of Patent: Nov. 2, 1993

[54] OPTICAL MODULATION METHOD OPERABLE IN AN OPTICAL TRANSMISSION PATH AND AN OPTICAL MODULATOR USING THE OPTICAL MODULATION METHOD

[75] Inventors: Yuji Azuma, Tokorozawa; Yoshihiro Shibata, Higashimurayama; Shinji Tamura, Tokorozawa; Nobuo Kuwaki, Irma; Nobuhiro Ikawa, Tokyo; Akira Fukuda, Kushiro; Akio Kuwahara, Tokushima, all of Japan

[73] Assignee: Nippon Telegraph and Telephone Corporation, Tokyo, Japan

[21] Appl. No.: 831,562

[22] Filed: Feb. 5, 1992

[30] Foreign Application Priority Data

Feb. 13, 1991 [JP] Japan .................................... 3-20027
Dec. 4, 1991 [JP] Japan ................................... 3-320641

[51] Int. Cl.$^5$ ............................................. G02B 6/26
[52] U.S. Cl. .......................................... 385/4; 385/13; 385/25; 385/28; 385/29; 385/32; 250/227.16
[58] Field of Search ................... 385/4, 13, 25, 28, 29, 385/32, 7; 250/231.19, 237 R, 227.14, 227.16

[56] References Cited

U.S. PATENT DOCUMENTS

| | | | |
|---|---|---|---|
| 4,071,753 | 1/1978 | Fulenwider et al. | 385/13 |
| 4,294,513 | 10/1981 | Nelson et al. | 385/4 |
| 4,488,040 | 12/1984 | Rowe | 385/102 |
| 4,667,097 | 5/1987 | Fasching et al. | 250/231 P |
| 4,848,872 | 7/1989 | Shigematsu et al. | 385/32 |
| 5,138,676 | 8/1992 | Stowe et al. | 385/32 |

FOREIGN PATENT DOCUMENTS

2-21735 1/1990 Japan .
2-291517 3/1990 Japan .

OTHER PUBLICATIONS de Block et al., Electronics Letters, Feb. 2 1984. vol. 20, No. 3; pp. 109–110; "Core Allignment Procedures for Single-Mode-Fibre Jointing".
So et al., Journal of Lightwave Technology, vol. LT-5, No. 12, Dec. 1987; "Splice Loss Measurement Using Local Launch and Detect"; pp. 1663–1666.
International Wire & Cable Symposium Proceedings 1989; "A Method for Identifying Single-Mode Fibers in an Operating Fiber Cable System"; 1989, Arakawa et al.
Fujisaki et al., 1990 Spring National Convention Rec. IEICE, B-904; "Development of Optical Fiber Telephone Using Plane of Polarization Modulation", 1990 pp. 4–83.

Primary Examiner—Frank Gonzalez
Attorney, Agent, or Firm—Frishauf, Holtz, Goodman & Woodward

[57] ABSTRACT

An optical modulation method operable in an optical transmission path using an optical fiber, wherein an optical fiber bending region is formed by bending a portion of the optical fiber into a U shape having a predetermined bending width. A bending width set point is set in correspondence with a predetermined inclined portion of a characteristic curve representing a dependency ratio of insertion loss of light propagating in said optical fiber bending region relative to the bending width thereof, said predetermined inclined portion of said characteristic curve being located between a predetermined maximum and minimum portion thereof. Intensity modulation of light propagating in the optical fiber is performed using a signal to be transmitted by adjusting the bending width of the optical fiber bending region in correspondence with the signal to be transmitted with reference to the bending width set point as a center.

5 Claims, 19 Drawing Sheets

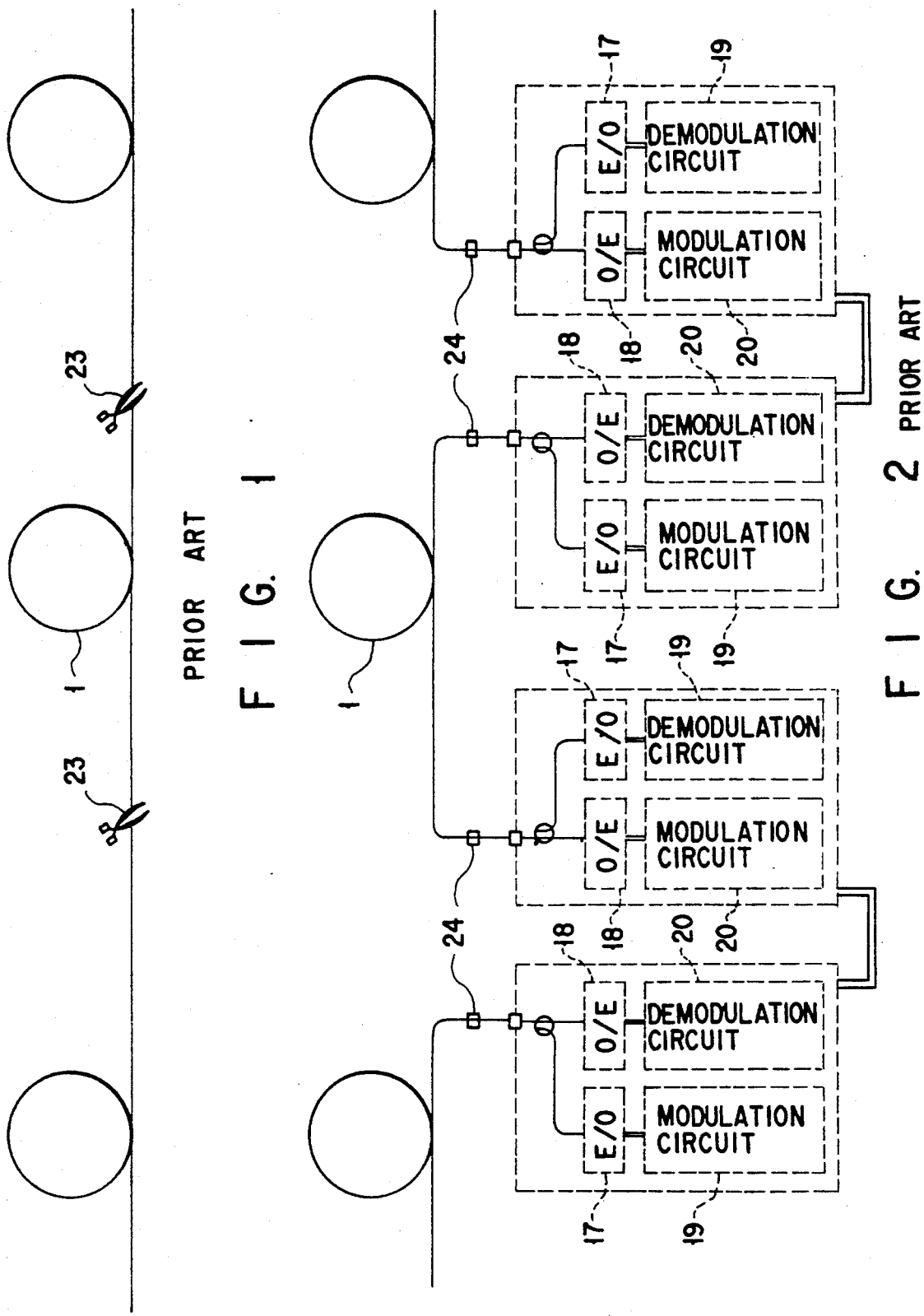

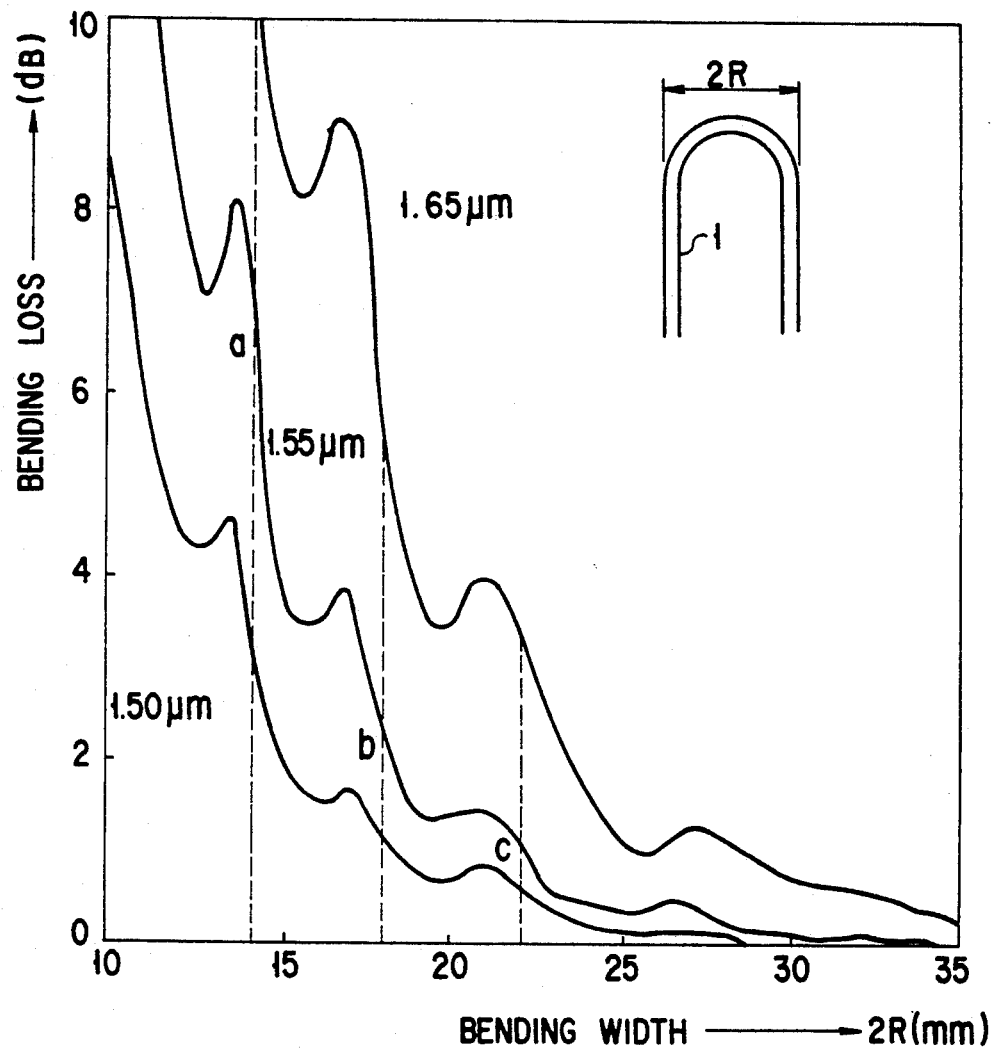
F I G. 4

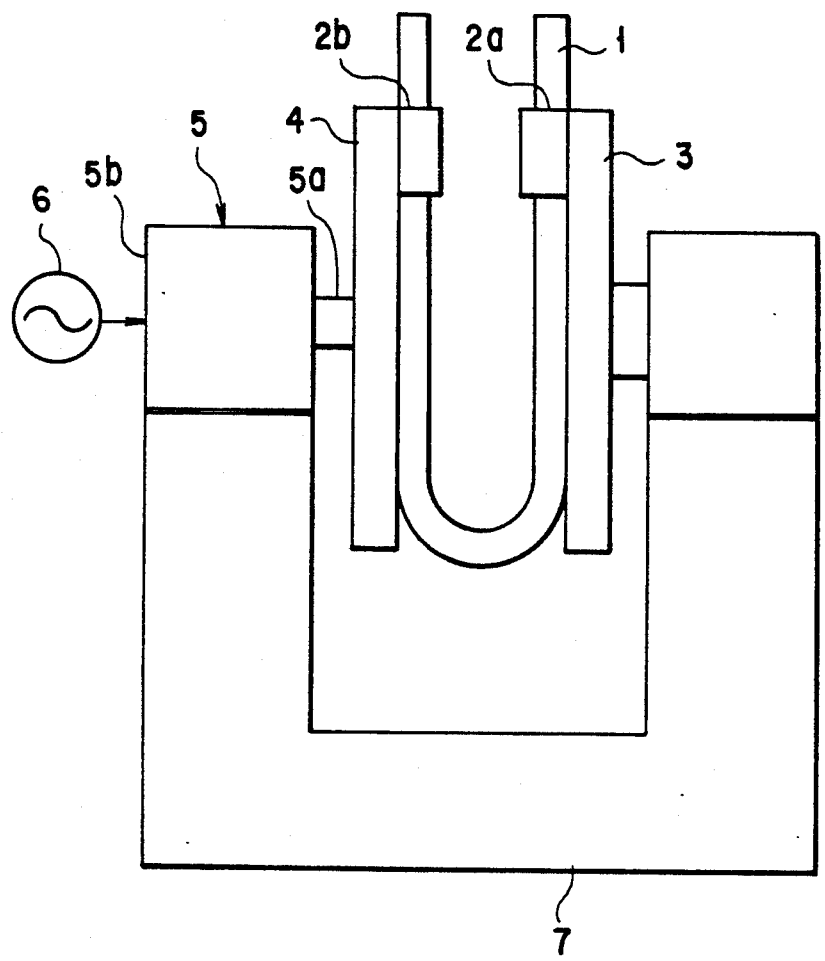
F I G. 5

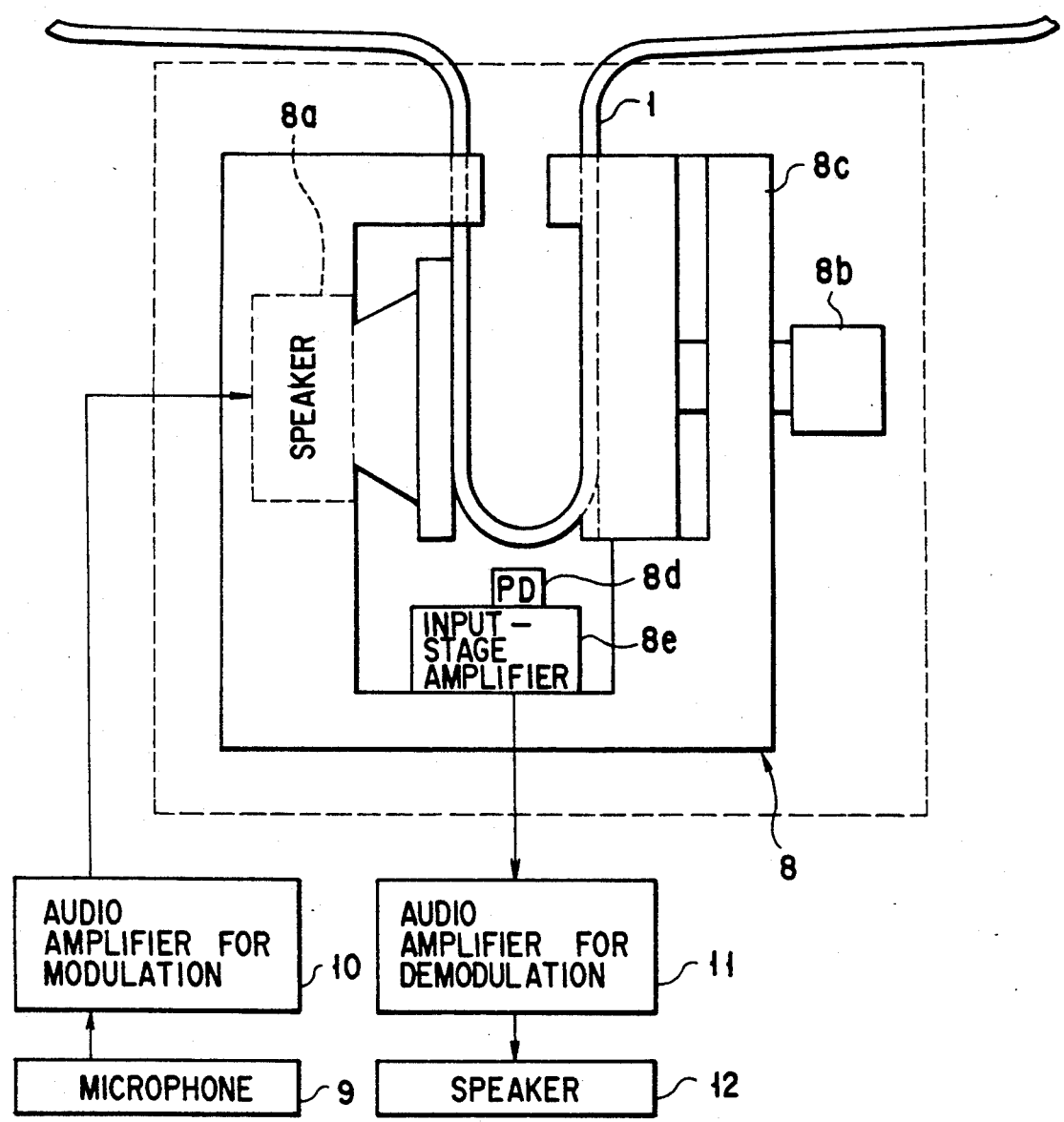
F I G. 11

OPTICAL MODULATION METHOD OPERABLE IN AN OPTICAL TRANSMISSION PATH AND AN OPTICAL MODULATOR USING THE OPTICAL MODULATION METHOD

BACKGROUND OF THE INVENTION

1. Field of the Invention

The present invention relates to an optical modulation method wherein, in an optical transmission path using an optical fiber, intensity modulation of light propagating in the optical fiber can be externally performed in proportion to an input electrical signal without cutting the optical fiber. The present invention further relates to an optical modulator using the optical modulation method, and an optical telephone using the optical modulator.

2. Description of the Related Art

Optical fiber cables are installed in main trunk routes nationwide as transmission media suitable for a long-distance, large-capacity transmission system. For this reason, installation works of optical fiber cables and cable conversion works are increasing in number year by year. In works associated with optical fiber cables, workers at separate places, e.g., a repeater station and a manhole, do their work concurrently in many cases. In order to smoothly do their work, talking between the workers must be easily performed.

A metallic pair for communication in an optical fiber cable has been used for talking between the workers. However, as the length of an optical transmission path is increased, talking through a metallic pair cannot be performed. In addition, since a non-metallic optical fiber cable has been introduced to realize a non-inductive, lightweight optical fiber cable, talking through an optical fiber is required. In a conventional scheme, talking through an optical fiber is performed as follows. An optical fiber 1 is cut at cutting points 23 located at intermediate points, as shown in FIG. 1, and O/E converters (optical/electrical converters) 18, and E/O converters (electrical/optical converters) 17 are connected between the cut fibers through fusion splice points 24, as shown in FIG. 2. In each electrical section, demodulation and modulation are respectively performed by a demodulation circuit 20 and a modulation circuit 19. In this method, however, cutting of optical fibers, fusing of cords having optical connectors, mounting of optical connectors, and the like require a long period of time, resulting in poor operational efficiency. In addition, since an optical fiber is cut and an end-face treatment is performed every time talking is performed, the optical fiber is gradually shortened. As a result, the designed slack in the optical fiber in a closure may become too short. Therefore, demand has arisen for a talking method which allows talking at an arbitrary place without cutting an optical fiber. As conventional talking methods allowing talking at an arbitrary place without cutting an optical fiber, methods of using local injection for transmission are known, e.g., methods disclosed in (1) Published Unexamined Japanese Patent Application No. 2-21735 (corresponding to an optical output section in FIG. 3) and (2) Electron. Lett. vol. 20, no. 3, pp. 109-110 (1984). In addition, methods of using local detection for reception are known, e.g., methods disclosed in (1) IWCS (International Wire & Cable Symposium Proceedings) 1989, and (2) J. Lightwave Technol., LT-5, 12, pp. 1663-1665 (1987).

In the local injection method, as shown in FIG. 3, a modulation signal is transmitted from an input signal source 6 to a light-source 21 to radiate modulated light 22 from the outside of an optical fiber 1 onto its bending region, thus forcibly injecting the light into the core of the optical fiber 1. The local detection method is a method of receiving light radiated from an optical fiber bending region.

In the local injection method, however, since the coupling efficiency of light radiated from the outside of the optical fiber into the optical fiber core is low, a signal can only be transmitted several kilometers at most. In addition, it is difficult to stably supply high radiation power. For these reasons, the local injection method is not very practical as a transmission method, and hence another transmission method is required.

Furthermore, a method of performing intensity modulation of light propagating in an optical fiber by applying/removing a bending force to/from the optical fiber has been proposed (see Published Unexamined Japanese Patent Application No. 64-35504). In this method, light propagating in an optical fiber is subjected to only intensity modulation in a digital manner. However, a method capable of analog modulation for, e.g., a voice signal is preferable.

In an apparatus capable of a talking operation without cutting an optical fiber, as disclosed in, e.g., 1990 Spring Natl. Conv. Rec. IEICE, B-904, vibrations are applied to an intermediate point of an optical fiber from its side surface by using a piezo-electric ceramic to cause fluctuations in polarization state of linearly polarized light propagating in the optical fiber. When the fluctuations in polarization are detected by a polarizer at a center, changes in intensity of the light can be obtained, and a signal can be obtained. This method allows modulation without cutting an optical fiber. However, talking between intermediate points must be performed as follows. Signal light transmitted from one intermediate point is demodulated at the center. Intensity modulation of a light-source is performed by using the resulting electrical signal. The resulting light is transmitted on a different optical fiber. The signal light is then detected at the other intermediate point by the local detection method, thus performing a talking operation. That is, the method is not very practicable, requiring two optical fibers for a talk, and allowing only a short-distance talk. Moreover, according to a method disclosed in Published Unexamined Japanese Patent Application No. 2-291517, a coil-like bending region is formed, and light propagating in an optical fiber is modulated by changing the coil bending radius. In this method, however, since the bending radius is changed by applying a tension to the optical fiber in the longitudinal direction, a frictional resistance is produced between a fiber support portion and the optical fiber. As a result, the optical fiber is distorted to cause a deterioration in modulation characteristics. The absence of a mechanism for adjusting the bending radius is another factor contributing to the deterioration in modulation characteristics.

SUMMARY OF THE INVENTION

The present invention has been made in consideration of the above situation, and has as its object to provide an optical modulation method wherein, in an optical transmission path using an optical fiber, intensity modulation of light propagating in the optical fiber is performed at an arbitrary place with high efficiency without cutting the optical fiber, and signal light propagating in the optical fiber is received at an arbitrary place, thereby allowing an easy, efficient talking operation with high quality. Further objects of the present invention are to provide an optical modulator using the optical modulation method, and an optical telephone using the optical modulator.

In order to achieve the above objects, according to the present invention, there is provided an optical modulation method, comprising the steps of:

forming an optical fiber bending region by bending an arbitrary portion of an optical fiber of an optical transmission path in a U shape;

setting an arbitrary portion of an inclination, formed between a given maximum portion and a given minimum portion on a characteristic curve representing a dependency ratio of insertion loss of light propagating in the optical fiber bending region on a bending width, as a bending width set point; and performing intensity modulation of a signal to be transmitted by causing the optical fiber to change in bending width in correspondence with the signal with reference to the bending width set point as the center.

In addition, an optical modulator using the optical modulation method of the present invention comprises:

fixing means for fixing one straight portion of an optical fiber bent in a U shape in the optical transmission path;

diaphragm means, fixed to the other straight portion, of the optical fiber, which opposes the one straight portion, for transmitting vibrations to the optical fiber; and transducer means for vibrating the diaphragm means.

Furthermore, an optical telephone of the present invention comprises:

an optical modulator including optical fiber guide means for guiding an optical fiber having a U-shaped bending region formed in an optical transmission path, and electromagnetic transducer means for vibrating one straight portion of the optical fiber;

means, electrically connected to the electromagnetic transducer means, for modulating a voice into an electrical signal and supplying the electrical signal to the electromagnetic transducer means; and means, arranged near the bending region of the optical fiber, for receiving light leaking from the bending region, converting the light into an electrical signal, and demodulating the electrical signal into a voice.

With the above-described arrangements, according to the optical modulation method of the present invention, the optical modulator using the optical modulation method, and the optical telephone using the optical modulator, in the optical transmission path using the optical fiber, intensity modulation of light propagating in the optical fiber can be externally performed at an arbitrary place of the optical fiber without cutting the optical fiber, and high-quality talk can be easily and efficiently performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing a conventional talking operation in which an optical fiber in an optical transmission path must be cut at intermediate portions;

FIG. 2 is a view showing a conventional talking method in which optical telephones, each having a modulation function, are connected between the two end-faces of each cut portion of the optical fiber shown in FIG. 1;

FIG. 4 is a graph showing bending loss (dB) rate as a function of bending width (2R mm) at a portion, of an optical fiber, which is bent in a U shape;

FIG. 5 is a view showing the schematic arrangement of an optical modulator according to an embodiment of the present invention;

FIG. 11 is a view showing the schematic arrangement of an optical telephone including the optical modulator according to the embodiment of the present invention;

DETAILED DESCRIPTION OF THE PREFERRED EMBODIMENTS

Embodiments of an optical modulation method, an optical modulator, and an optical telephone according to the present invention will be described below with reference to the accompanying drawings.

In brief, the present invention is characterized in that in order to allow a talking operation at an arbitrary place of an optical fiber, a transmission method is designed such that the optical fiber is bent, the bending width is adjusted to fall in a region in which modulation can be performed with high efficiency, and the bending width is slightly changed by means of vibrations using the bending width as the center.

FIG. 4 is a graph showing the dependence of insertion loss on bending width at a portion, of an optical fiber, which is bent in a U shape as shown in FIG. 5. The wavelengths of light to be measured are set to be 1.50 μm, 1.55 μm, and 1.65 μm. With an increase in bending width 2R, the insertion loss is gradually decreased with small drifts. The reason why the insertion loss characteristics include such small drifts will be described below.

Figure 3:
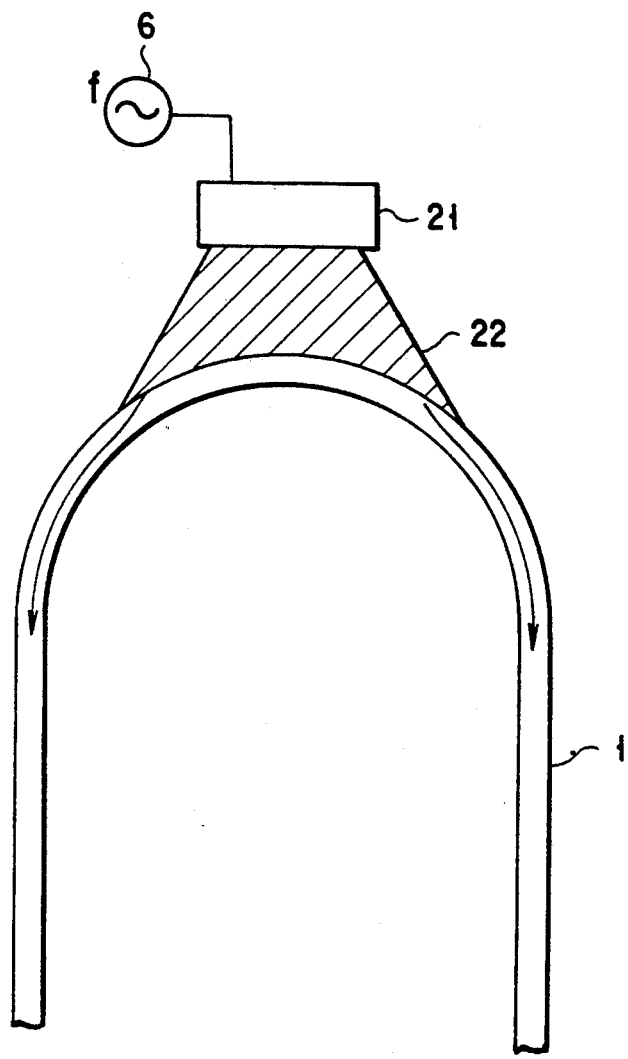
FIG. 3 is a view for explaining a known conventional local injection method of transmitting a signal at an arbitrary place of an optical fiber.
Figure 6A:
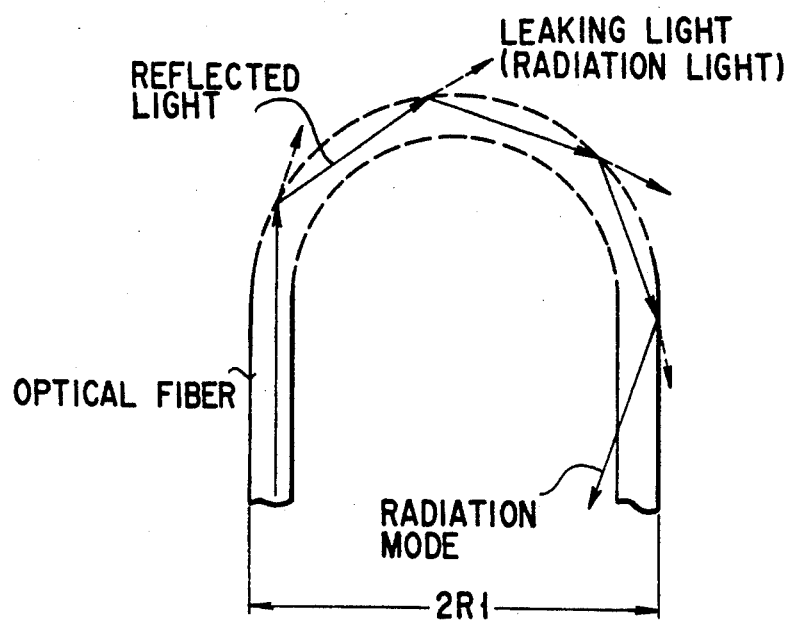
FIG. 6A is a view showing a case wherein, at a bending region of an optical fiber, propagation light is repeatedly multi-reflected in the cladding of the optical fiber to be set in a radiation mode.
Figure 6B:
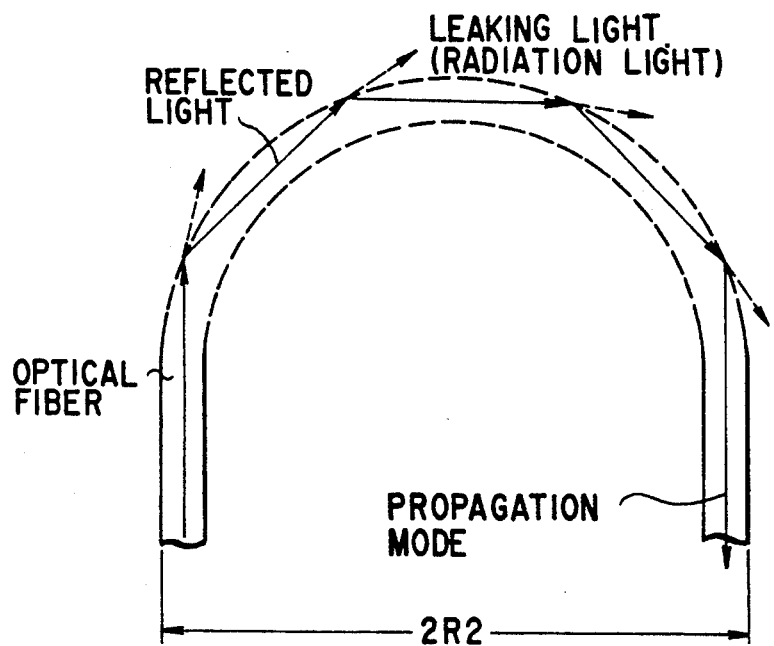
FIG. 6B is a view for explaining a case wherein the bending width (2R) of the bending region of the optical fiber shown in FIG. 6A is changed so that the propagation light is repeatedly multi-reflected in the cladding of the optical fiber to be set in a propagation mode and propagates in the core.
Figure 7:
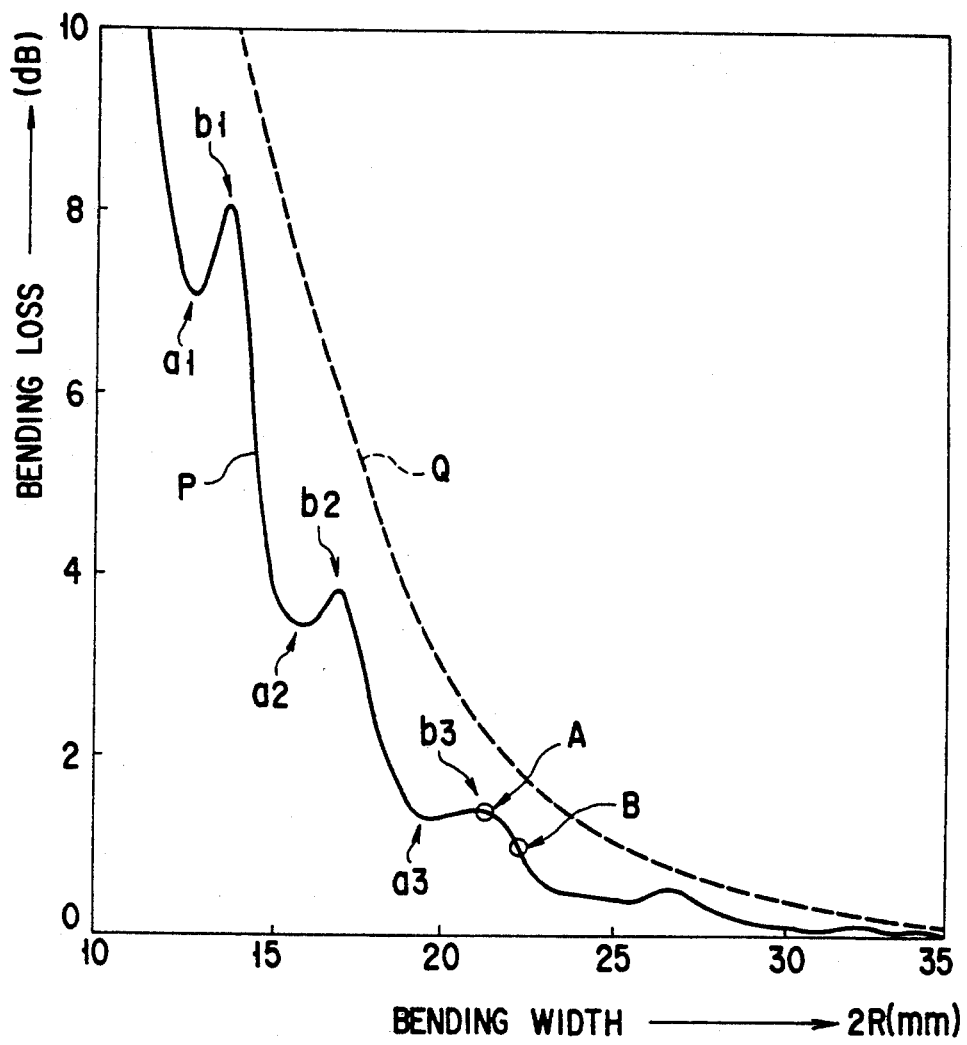
FIG. 7 is a graph showing bending loss rate as a function of bending width of an optical fiber and used to explain a bending width suitable for intensity modulation proportional to an input electrical signal.
Figure 8:
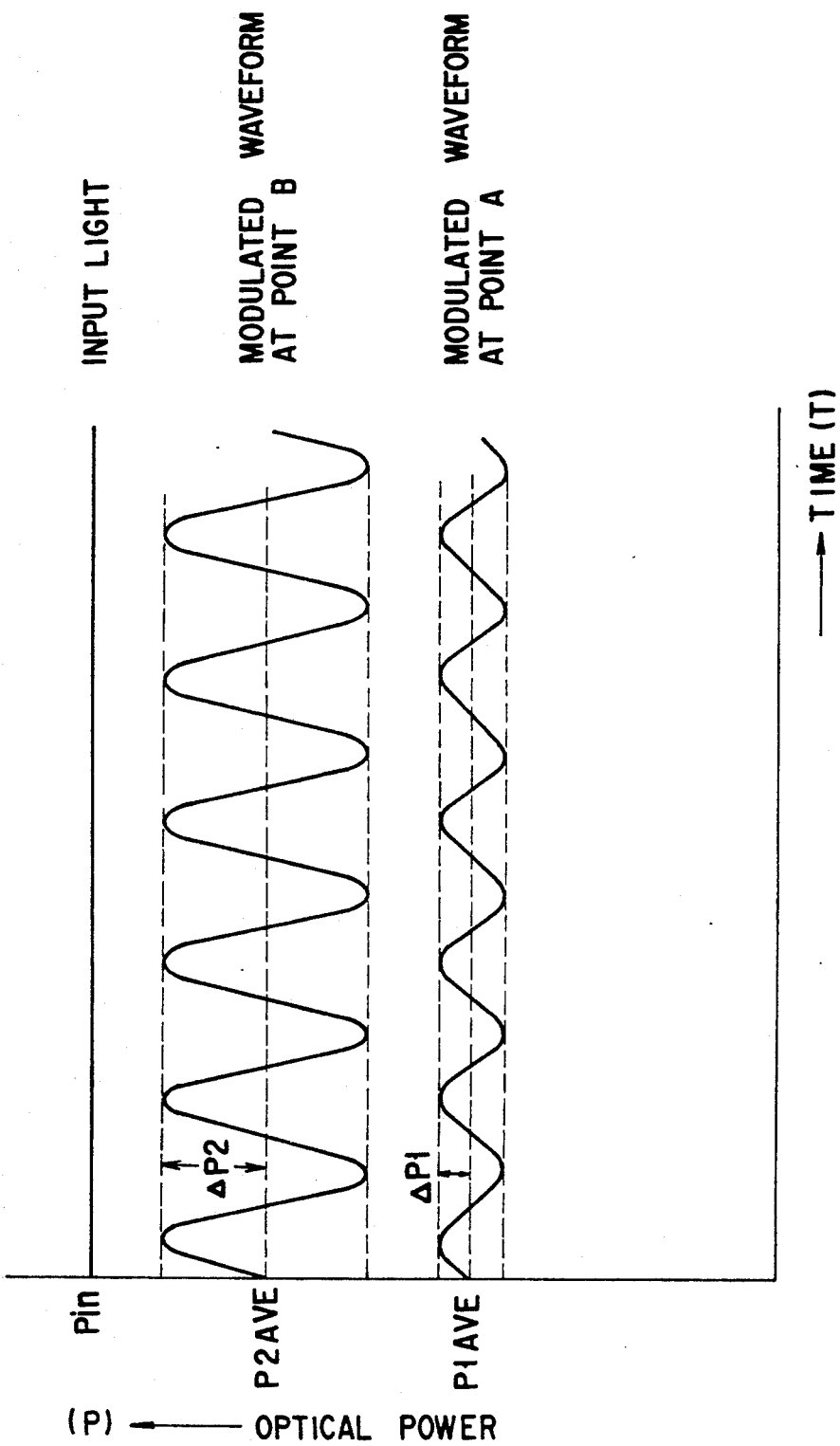
FIG. 8 is a chart showing modulated waveforms at specific positions on the graph shown in FIG. 7.

Part of propagation light in the propagation mode which propagates through an optical fiber core leaks from the optical fiber core at an optical fiber bending region and is converted into light in the radiation mode. The light in the radiation mode propagates straight in an optical fiber cladding for a while. While part of the light is radiated out of the cladding through a cladding inner wall, another part of the light is reflected by the cladding inner wall and propagates until it reaches the cladding inner wall again. Subsequently, radiation and reflection are repeated in the same manner as described above. When the bending width is changed, such multi-reflected light from the cladding inner wall may change its angle of reflection and become incident on the core again to be converted into light in the propagation mode. FIG. 6A shows a case wherein light is repeatedly multi-reflected, and last reflected light is set in the radiation mode at a bending end portion. The phenomenon of the radiation mode shown in FIG. 6A corresponds to maximum portions (convex portions) $b_1$ to $b_3$ of the characteristic curve shown in FIG. 7, whereas the phenomenon of the propagation mode shown in FIG. 6B corresponds to minimum portions (concave portions) $a_1$ to $a_3$ of the characteristic curve. Referring to FIG. 7, a solid curve P indicates a measurement result, and a dotted curve Q indicates a characteristic obtained when all reflected light in the radiation mode is radiated. According to these characteristics, therefore, intensity modulation can be performed to the highest degree by adjusting the bending width 2R at portions where the inclinations between the convex and concave portions are large. FIG. 8 shows modulated waveforms obtained by performing modulation at a small-inclination point A and a large-inclination point B in FIG. 7 with the respective bending widths as the center. At the point A, incident light as non-modulated light is modulated with an amplitude $\Delta P_1$ with reference to a level $P_{1AVE}$ as the center. At the point B, the incident light is modulated with an amplitude $\Delta P_2$ with reference to a level $P_{2AVE}$ higher than the level $P_{1AVE}$ as the center. Efficient modulation with low insertion loss can be performed by selecting one inclination, of the large inclinations between convex and concave portions, which is located in a region where the bending width 2R is larger.

FIG. 5 shows the structure of an optical modulator according to the present invention. As shown in FIG. 5, an optical fiber 1 is bent in a U shape. One side (right side in FIG. 5) of the U-shaped portion is fixed to a stationary plate 3 through a fixing member 2a, while the other side (left side in FIG. 5) is fixed to a diaphragm 4 through a fixing member 2b. An electromagnetic transducer 5 has a movable coil portion 5a and a movable coil vibrator 5b and is fixed to a mounting base 7 together with the stationary plate 3 while a predetermined positional relationship between the transducer 5 and the stationary plate 3 is maintained. The diaphragm 4 is fixed to an end portion of the movable coil portion 5a to supply an electrical signal in, e.g., a voice band. With this arrangement, the electromagnetic transducer 5 vibrates the diaphragm 4 in accordance with an electrical signal supplied from an input signal source 6. The bending ratio of the optical fiber 1 is changed through the vibrations of the diaphragm 4.

Figure 9:
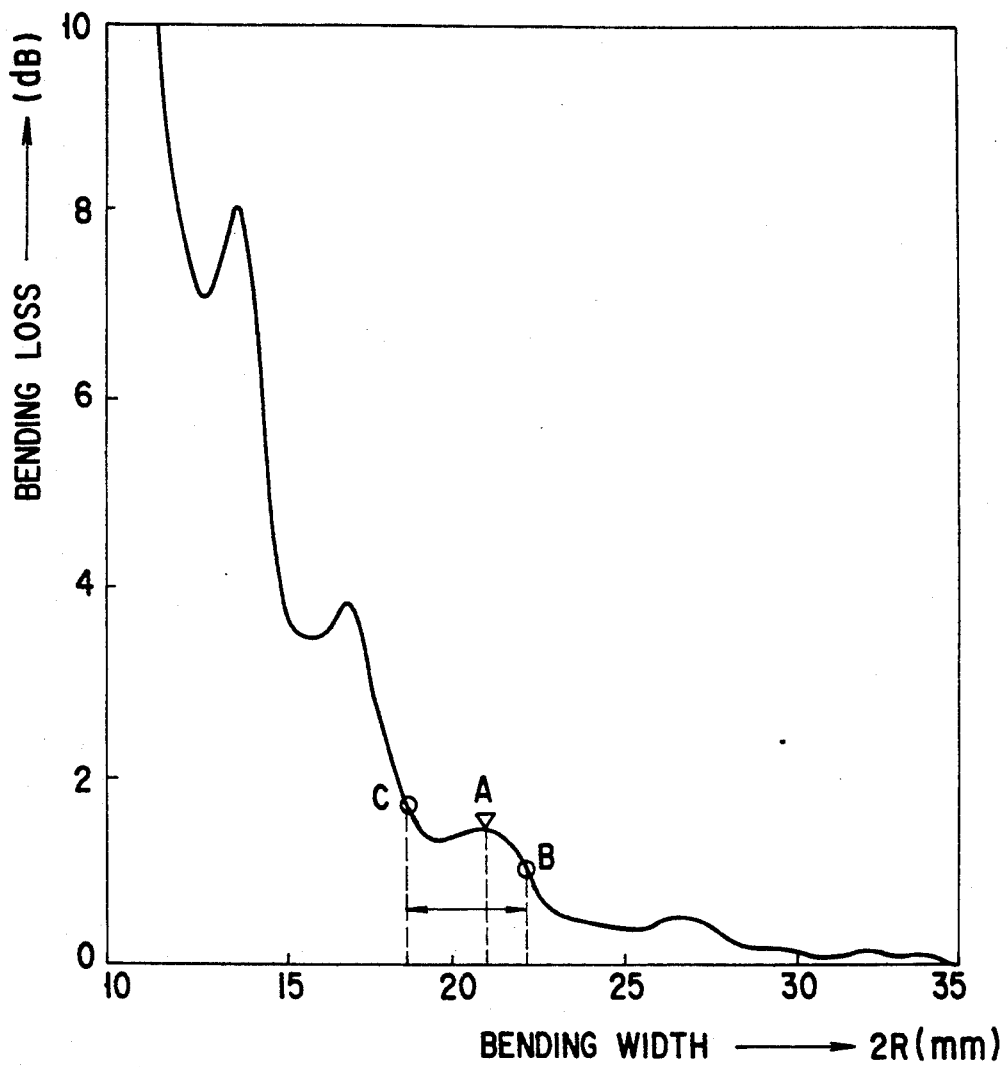
FIG. 9 is a graph for explaining the magnitude of the modulation degree of the optical modulator shown in FIG. 5 in terms of the amount of change in bending loss with respect to the bending width of an optical fiber.

FIG. 9 shows the result of bending loss measurement in which an optical fiber is bend at an angle of 180° to be formed into a U shape, and the bending width is changed. Note that the wavelength of the measured light is 1.55 μm, and the measured optical fiber is a standard 1.3-μm optical fiber. It is apparent from this result that the amount of bending loss greatly changes around bending widths of 14, 18, and 22 mm. Assume that the initial value of the bending width 2R, obtained when the optical fiber is bent in a U shape, is set to a point A. In this case, since the amount of change in bending loss is small with respect to a change in bending width, the modulation degree is low. As the bending width is shifted from the point A to a point B or C by fine adjustment, the amount of change in bending loss is increased with respect to a change in bending width, resulting in an increase in modulation degree.

Figure 10:
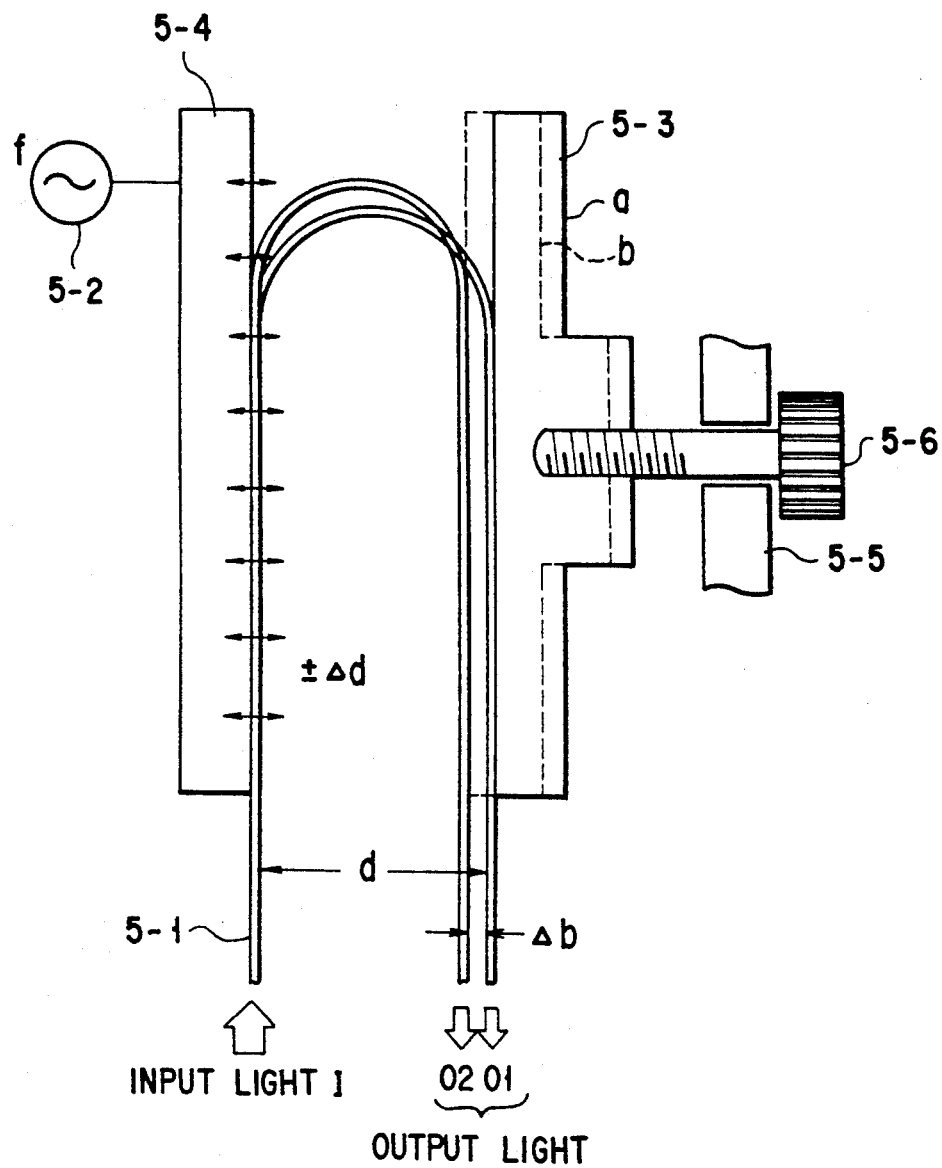
FIG. 10 is a view showing an arrangement in which a fine movement adjusting knob for adjusting the bending width of an optical fiber is provided for the optical modulator shown in FIG. 5.

FIG. 10 shows an arrangement in which a fine movement adjusting knob is provided for the optical modulator shown in FIG. 5. Referring to FIG. 10, reference numeral 5-1 denotes an optical fiber; 5-2, a signal source; 5-3, a stationary plate (a: initial position, b: optimal position set by fine adjustment); 5-4, a diaphragm; 5-5, a case; and 5-6, a fine adjustment knob.

The optical fiber 5-1 is bent in a U shape between the stationary plate 5-3 and the diaphragm 5-4. The diaphragm 5-4 connected to the signal source 5-2 is vibrated in the directions indicated by the arrows in FIG. 10 at a frequency f and an amplitude ±Δd, thereby changing the bending width of the optical fiber 5-1 by ±Δd. With this operation, light propagating in the optical fiber 5-1 undergoes intensity modulation at the frequency f. In order to realize efficient modulation with low insertion loss to a higher modulation degree, modulation is performed in an optimal state by adjusting the position of the stationary plate 5-3 using the fine adjustment knob 5-6.

FIG. 11 shows the structure of an optical telephone using the optical modulator of the present invention. Referring to FIG. 11, an optical transmission/reception unit 8 is formed by using the above-described optical modulator. More specifically, the electromagnetic transducer 5 (see FIG. 5) of the optical modulator is replaced with a speaker 8a, and a micro-stage 8b, an optical fiber guide 8c, an O/E converter 8d, and an input amplifier 8e are incorporated in the unit. The speaker 8a serves to convert an input electrical signal in a voice band into a change in bending width of the optical fiber 1. The micro-stage 8b sets the bending width of the optical fiber 1, whose position is regulated by the optical fiber guide 8c, to the central bending width in a specific bending width range. The O/E converter 8d constituted by a photodiode is arranged to oppose the middle portion of the bending region of the optical fiber 1 and is designed to convert intensity-modulated light which is transmitted from a given point and leaks from the optical fiber 1, into an electrical signal. A microphone 9 converts a voice into a voice signal and supplies the voice signal to the speaker 8a through an audio amplifier 10 for modulation. A speaker 12 performs reproduction of an electrical signal converted by the O/E converter 8d through an audio amplifier 11 for demodulation.

Figure 12:
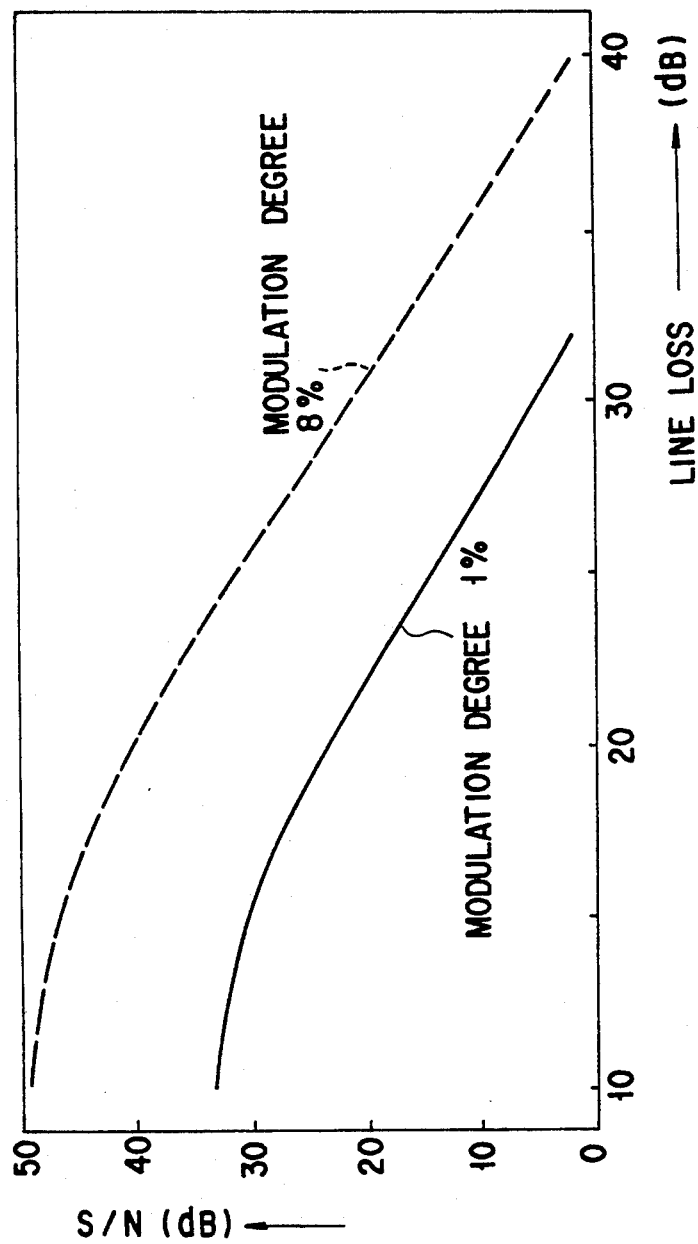
FIG. 12 is a graph for explaining communication quality in terms of a difference in modulation degree.

Referring to FIG. 12, the line loss is plotted along the axis of abscissa and the S/N ratio is plotted along the axis of ordinate. The solid curve and the dotted curve in FIG. 12 represent the measurement results of the S/N ratios with a low modulation degree (1%) and a high modulation degree (8%), respectively, when modulation is performed by using the optical modulator of the present invention shown in FIG. 5 and modulated light is directly received at a line end portion. As is apparent from the graph, if the modulation degree is low, the S/N ratio is low, resulting in a deterioration in communication quality. Assume that a S/N ratio >20 dB is a requirement for quality communication. In this case, when the modulation degree is 1%, the requirement cannot be satisfied unless the line loss is set to be about 22 dB or less. In contrast to this, when the modulation degree is 8%, the requirement can be satisfied even with a line loss of about 31 dB. Therefore, it is preferable that a talking operation be performed with the maximum modulation degree set by finely adjusting the bending width 2R.

Figure 13:
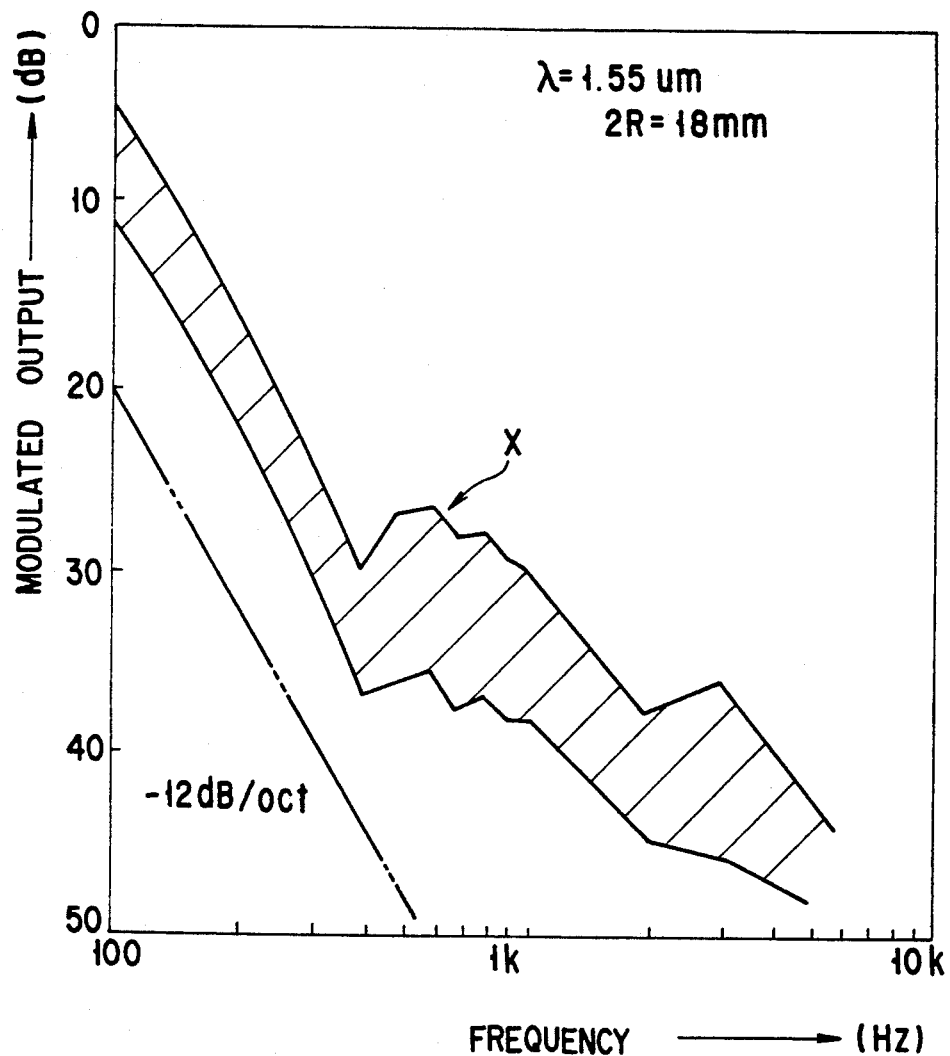
FIG. 13 is a graph showing measured values of modulated output characteristics with respect to the modulation frequency measured at a line end portion upon modulation by the optical modulator shown in FIG. 5.

Referring to FIG. 13, the modulation frequency is plotted along the axis of abscissa, and the modulated output is plotted along the axis of ordinate. This graph shows the result obtained by measuring modulation frequency characteristics when modulation is performed by using the optical modulator of the present invention shown in FIG. 5 and modulated light is directly received at a line end portion. In this case, the bending width 2R is 18 mm, and a propagating light wavelength λ is 1.55 μm. Measurement was performed by using several optical fibers having different parameters, e.g., the size of a core, the refractive index distribution of a core, and the transmission characteristics of an optical fiber. Although a slight variation X is caused due to the different parameters of the optical fibers, the modulation frequency characteristics of the optical fibers exhibit substantially the same tendency. It is, therefore, apparent that modulation can be performed almost independently of the parameters of the optical fibers.

Figure 14:
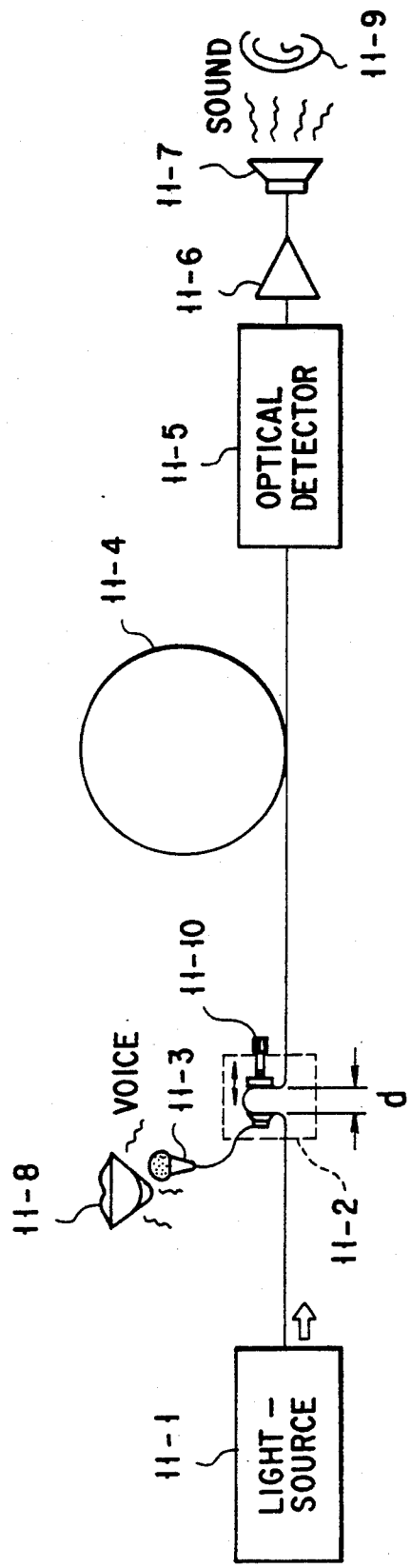
FIG. 14 is a view for explaining an optical talking system between an intermediate point and an end portion of an optical fiber, in which propagation light is modulated and transmitted at the intermediate point of the transmission path by using the optical telephone of the present invention, the propagation light is converted into an electrical signal at an end portion of the transmission path by using an optical detector, and is reproduced as a voice.

FIG. 14 shows an optical talking system using the optical modulator of the present invention. Referring to FIG. 14, reference numeral 11-1 denotes a 1.5-μm laser diode (LD) light-source; 11-2, an optical fiber external modulator; 11-3, a microphone; 11-4, an optical fiber; 11-5, an optical detector; 11-6, an amplifier; 11-7, a speaker; 11-8, a voice generator; 11-9, an ear; and 11-10, a bending width fine adjustment knob.

A sound generated by the voice generator 11-8 is converted into an electrical signal by the microphone 11-3. The electrical signal is then input to the optical fiber external modulator 11-2. The electrical voice signal input to the optical fiber external modulator 11-2 causes a diaphragm to vibrate, thus slightly changing the bending width of the U-shaped optical fiber. Assume that the bending width of the optical fiber bent in a U shape is represented by d. The bending width d can be slightly changed by the fine adjustment knob 11-10. Light having a wavelength of 1.55 μm emitted from the light source 11-1 is incident on the optical fiber 11-4 and is intensity-modulated in accordance with a slight bending width change caused by the optical fiber external modulator 11-2. The intensity-modulated light propagates in the optical fiber 11-4 to be converted into an electrical signal, at an end portion of the optical fiber, by the optical detector 11-5. The electrical signal is amplified by the amplifier 11-6, and the sound is reproduced by the speaker 11-7. The clearness of the sound generated by the speaker 11-7 is evaluated by the ear 11-9.

The dependence of the clearness of a sound generated by the speaker 11-7 on the bending width is evaluated by the following system. The clearness of a sound at the bending width d=21 mm is very poor, and the voice is almost inaudible. In this state, if the bending width d is set to be 22 mm by using the fine adjustment knob 11-10, the clearness of a sound can be greatly improved.

Figure 15:
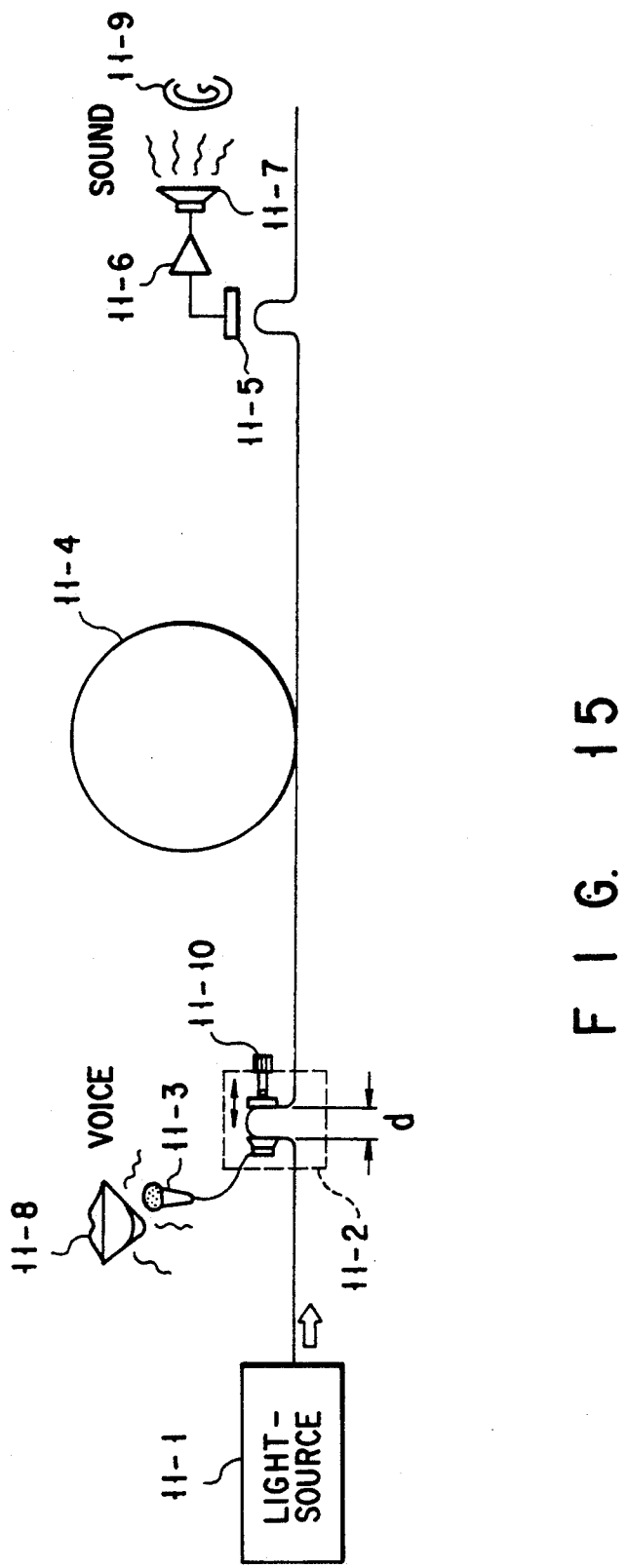
FIG. 15 is a view for explaining an optical talking system between intermediate points of an optical fiber, in which bending regions are formed at the transmission section at the intermediate point shown in FIG. 14 and another intermediate point, leakage light (radiation light) from the bending region is received to be converted into an electrical signal, and is reproduced as a voice.

The same result as that described above can be obtained by a system shown in FIG. 15, which is designed to receive radiation light from bending regions. The same reference numerals in FIG. 15 denote the same parts as in FIG. 14, and a description thereof will be omitted.

Figure 16:
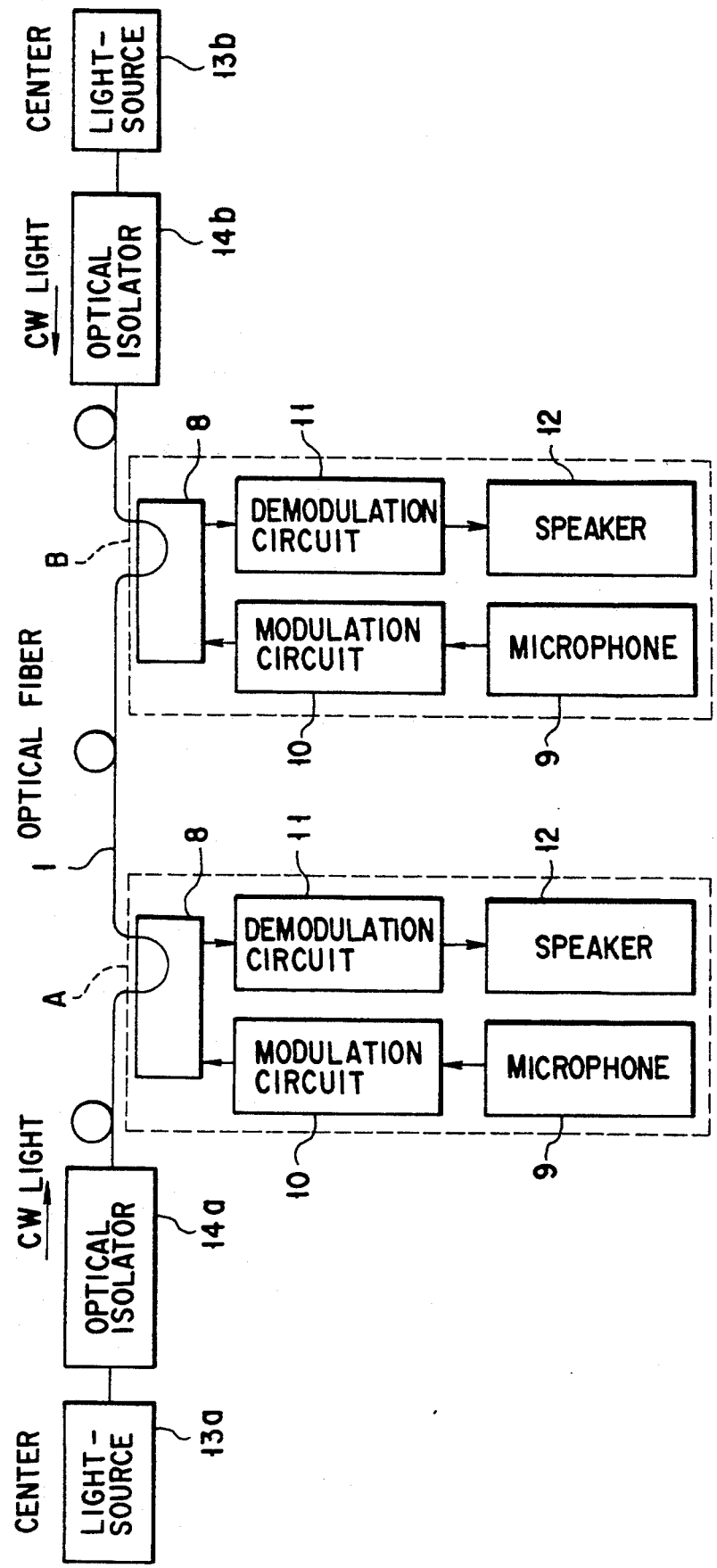
FIG. 16 is a view for explaining a system capable of bidirectional, simultaneous talk between two intermediate points at which optical telephones each using the optical modulator of the present invention are arranged.

FIG. 16 shows an optical talking system using the optical modulator of the present invention. As shown in FIG. 16, this optical talking system includes light-sources 13a and 13b for outputting carrier signals, and optical isolators 14a and 14b for protecting laser light by attenuating light propagating in a direction opposite to that of the laser light. The optical talking system is designed to input continuous wave (CW) light beams as carrier signals, each having an output of 0 dBm, from two centers to an optical fiber 1 from opposite directions. In the optical talking system, working cites A and B having optical telephones using speakers are arranged at intermediate positions along the optical fiber 1. In each of the working cites A and B, a demodulation system is designed such that light radiated from a bending region is received, and a voice from another point is reproduced by a speaker 12 through a demodulation circuit 11, and a modulation system is designed such that a voice signal is input from a microphone 9 and is transmitted to an optical fiber vibration system through a modulation circuit. This optical talking system enables bidirectional, simultaneous talk between a large number of workers located at the two centers (13a and 13b) and the working cites A and B.

Figure 17:
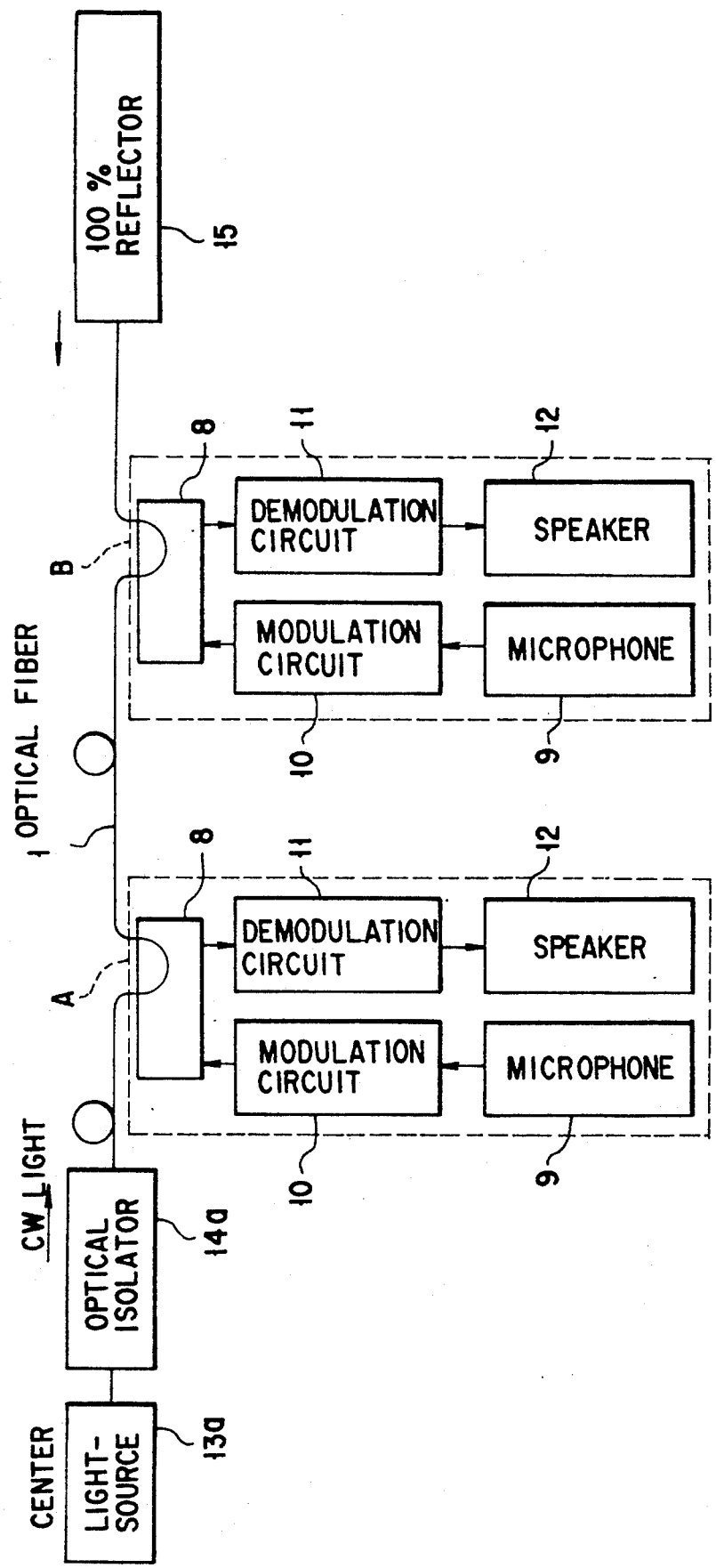
FIG. 17 is an optical talking system in which a 100% reflector is used in place of a light-source arranged at one end position of the embodiment shown in FIG. 16.

FIG. 17 shows another embodiment of the optical talking system using the optical modulator according to the first embodiment of the present invention. In this embodiment, one light-source shown in FIG. 16 is replaced with a 100% reflector 15. The embodiment is effective as an arrangement for a case wherein one end of the system is connected to a user or cut. This optical talking system enables bidirectional, simultaneous talk between a large number of workers located at a center (13a) and working cites A and B. The same reference numerals in FIG. 17 denote the same parts as in FIG. 16, and a description thereof will be omitted.

Figure 18:
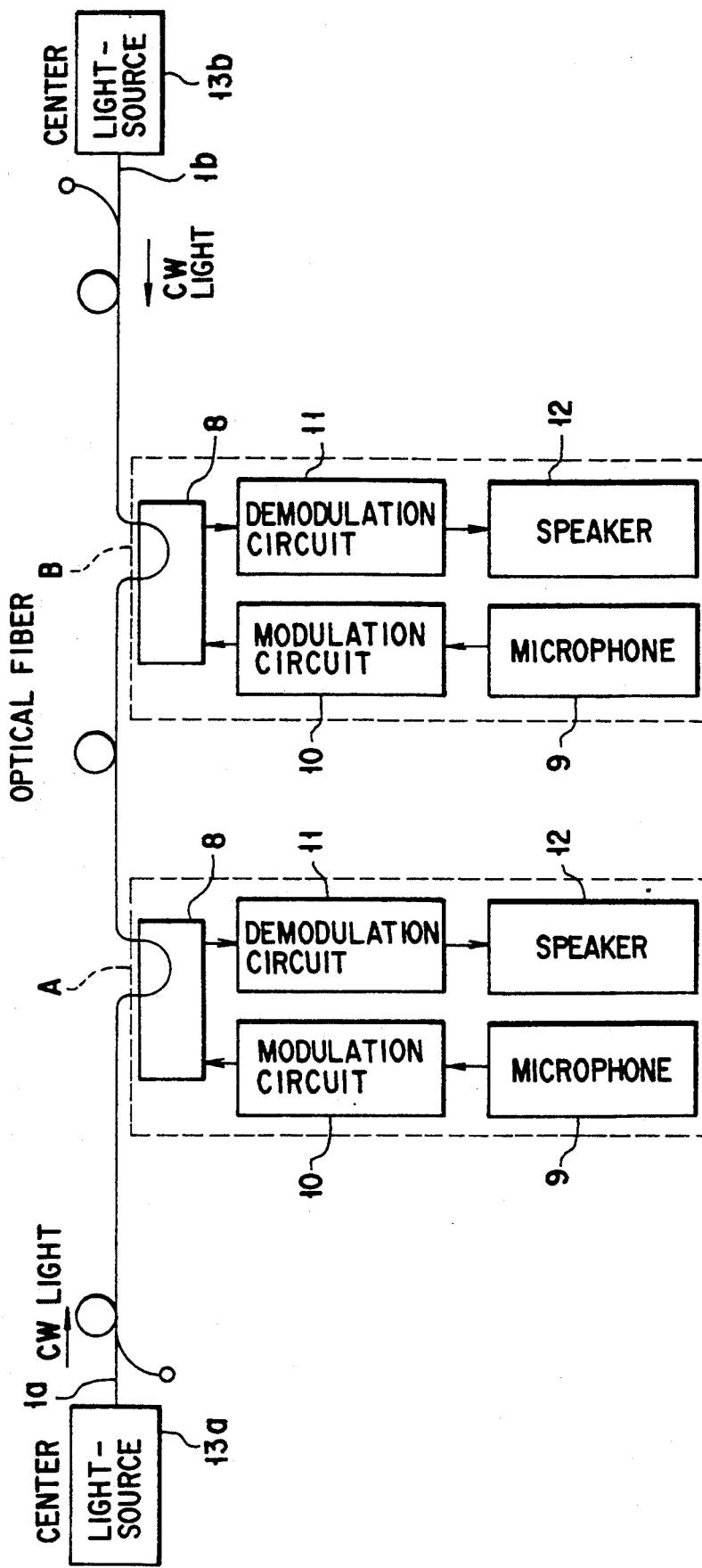
FIG. 18 is a view for explaining a system of capable of bidirectional, simultaneous talk between two intermediate points by using two optical fibers in the embodiment shown in FIG. 16.

FIG. 18 shows an optical talking system using an optical modulator of the present invention. The arrangement of this embodiment is equivalent to that shown in FIG. 16 except that the one optical fiber 1 is replaced with two optical fibers. Since different optical fibers 1a and 1b are used in upward and downward directions, light beams do not collide with each other, and no optical isolators for protecting laser light are required. This optical talking system enables bidirectional, simultaneous talk between a large number of workers located at centers (13a and 13b) and working cites A and B. The same reference numerals in FIG. 18 denote the same parts as in FIG. 16, and a description thereof will be omitted.

Figure 19:
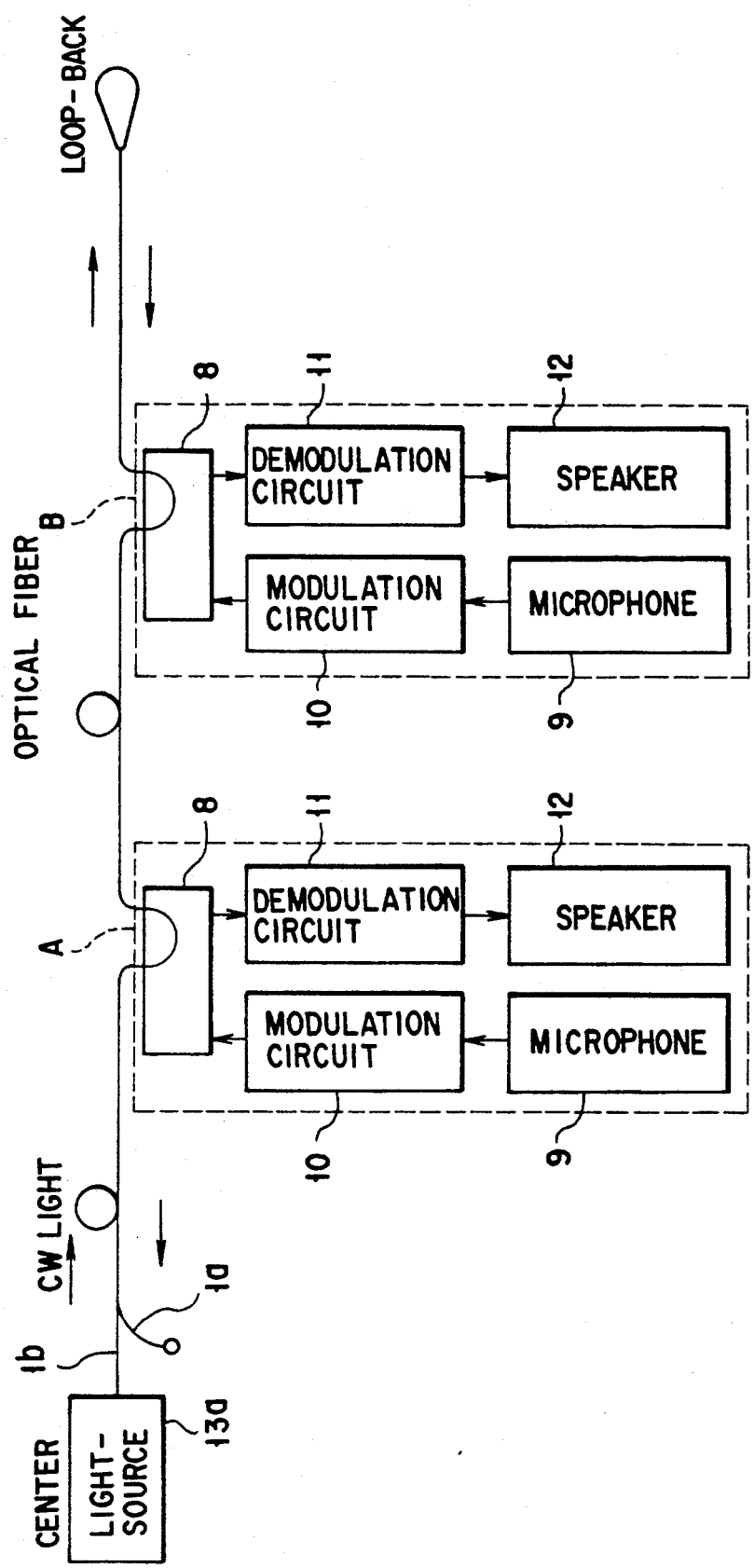
FIG. 19 is an optical talking system in which the light-source arranged at one end position of the embodiment shown in FIG. 16 is replaced with a loop-back of the optical fiber.

FIG. 19 shows still another embodiment of the optical talking system using the optical modulator of the present invention. The arrangement of this embodiment is equivalent to that shown in FIG. 16 except that one light-source is replaced with a loop-back of an optical fiber. More specifically, a signal from a center is transmitted to working cites A and B through an optical fiber 1b. A signal from the working cite A is transmitted to the working cite B through the optical fiber 1b and is looped back at an end portion to be transmitted to the center (13a) through an optical fiber 1a. A signal from the working cite B is looped back at the end portion to be transmitted to the working cite A and the center (13a) through the optical fiber 1a. Therefore, in this optical talking system, bidirectional, simultaneous talk between a large number of workers located at the center (13a) and the working cites A and B can be performed. Similar to the embodiment shown in FIG. 17, this embodiment is effective as an arrangement for a case wherein one end the system is connected to a user or cut. The same reference numerals in FIG. 19 denote the same parts as in FIG. 16, and a description thereof will be omitted.

Figure 20:
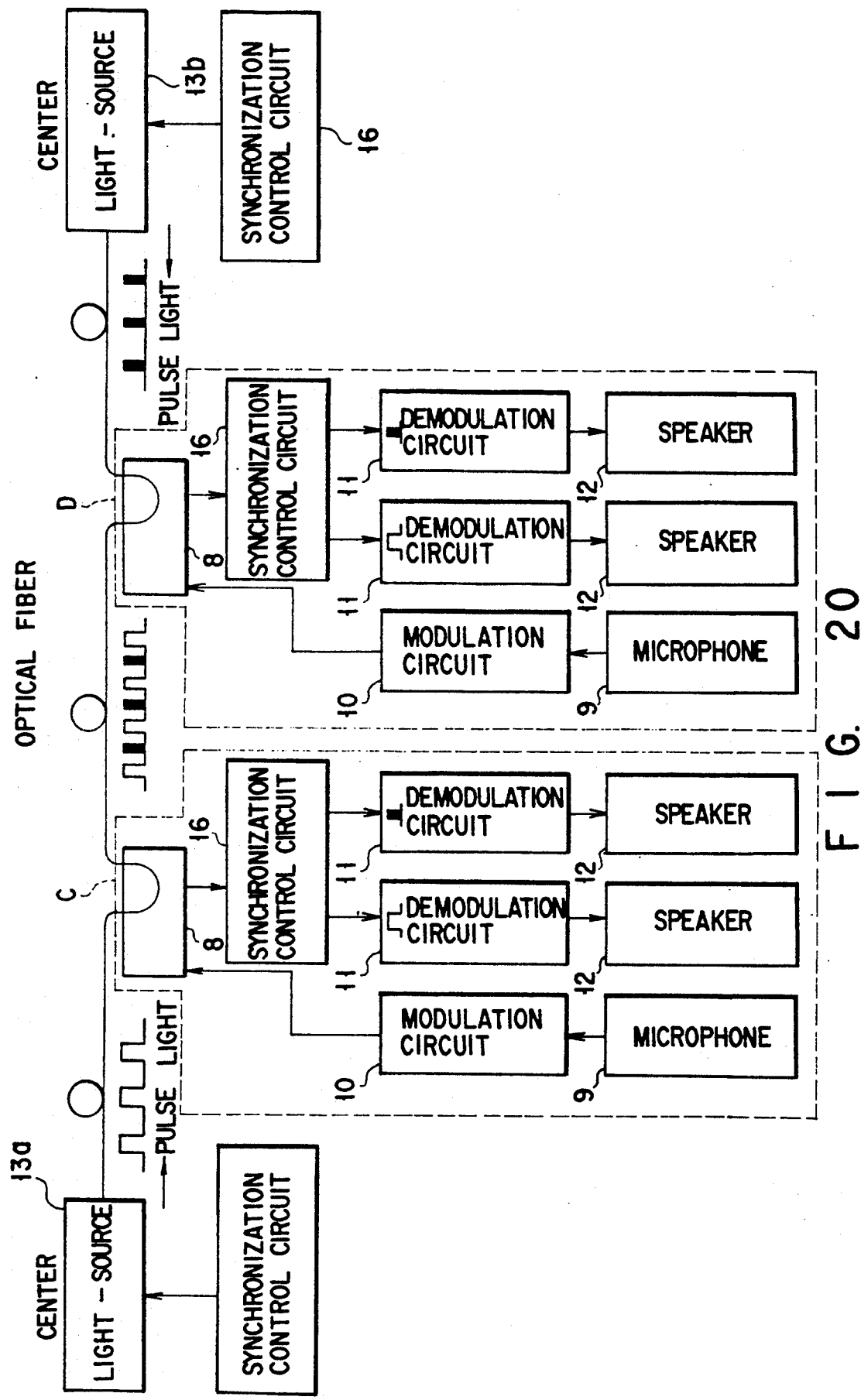
FIG. 20 is a view for explaining an optical talking system in which pulse light is used as a carrier signal in the embodiment shown in FIG. 17.

FIG. 20 shows an arrangement equivalent to that shown in FIG. 17 except that pulse light is used as a carrier signal. Referring to FIG. 20, reference symbols C and D respectively denote working cites, each having a synchronization control circuit 16 in addition to the optical transmission/reception unit 8 shown in FIG. 11. Pulse light beams having frequencies sufficiently higher than a voice band are transmitted from two centers through the synchronization control circuits 16 such that the pulses do not overlap each other. Transmission of a signal from each of the working cites C and D is performed by using the optical modulator according to the first embodiment. In reception, pulses are separately received in accordance with the transmission directions of signals. By separately transmitting/receiving pulses in this manner, the S/N ratio can be improved. In addition, since the use of pulse light has no influence on laser light, no optical isolator for protecting laser light is required. The same reference numerals in FIG. 20 denote the same parts as in FIG. 17, and a description thereof will be omitted.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical modulation method operable in an optical transmission path using an optical fiber, said method comprising the steps of:

forming an optical fiber bending region by bending a portion of said optical fiber into a U shape having a predetermined bending width;

setting a bending width set point in correspondence with a predetermined inclined portion of a characteristic curve representing a dependency ratio of insertion loss of light propagating in said optical fiber bending region relative to the bending width thereof, said predetermined inclined portion of said characteristic curve being located between a predetermined maximum portion and a predetermined minimum portion thereof; and performing intensity modulation of a signal to be transmitted by adjusting the bending width of the optical fiber bending region in correspondence with the signal to be transmitted with reference to the bending width set point as a center.

2. The method according to claim 1, wherein the step of setting a bending width set point comprises setting a bending width set point in correspondence with a predetermined portion of said characteristic curve which is located in a region where a large bending width is set.

3. An optical modulator arranged in an optical transmission path using an optical fiber, said optical fiber including an optical fiber bending region bent into a U shape having a first substantially straight leg and a second substantially straight leg opposing and spaced from said first leg, said optical modulator comprising:

fixing means for fixing said first leg;

diaphragm means, fixed to said second leg, for transmitting vibrations to said optical fiber; and transducer means for vibrating said diaphragm means.

4. The modulator according to claim 3, further comprising adjustment means for adjusting a position of said fixing means, said adjustment means adjusting a bending width of said optical fiber bending region bent in said U shape.

5. The modulator according to claim 3, wherein said vibrating means comprises an electromagnetic transducer.

* * * * *